(12) United States Patent
Kokernak et al.

(10) Patent No.: US 9,088,831 B2
(45) Date of Patent: *Jul. 21, 2015

(54) SYSTEMS AND METHODS FOR PROVIDING A NETWORK LINK BETWEEN BROADCAST CONTENT AND CONTENT LOCATED ON A COMPUTER NETWORK

(75) Inventors: Michael Kokernak, Dorcester, MA (US); Madeleine Noland, Qunicy, MA (US); Colin Campbell, Norwood (GB); Gordon Bechtel, Newburyport, MA (US)

(73) Assignee: Rakuten, Inc., Tokyo (JP)

( * ) Notice: Subject to any disclaimer, the term of this patent is extended or adjusted under 35 U.S.C. 154(b) by 566 days.

This patent is subject to a terminal disclaimer.

(21) Appl. No.: 13/417,579

(22) Filed: Mar. 12, 2012

(65) Prior Publication Data

US 2012/0174142 A1    Jul. 5, 2012

Related U.S. Application Data

(63) Continuation of application No. 12/603,897, filed on Oct. 22, 2009, now Pat. No. 8,160,064, which is a continuation-in-part of application No. 12/288,672, filed on Oct. 22, 2008, now abandoned.

(51) Int. Cl.
*H04L 12/28* (2006.01)
*H04N 21/61* (2011.01)
(Continued)

(52) U.S. Cl.
CPC ....... *H04N 21/6125* (2013.01); *H04N 7/17318* (2013.01); *H04N 21/4622* (2013.01); *H04N 21/4722* (2013.01); *H04N 21/6118* (2013.01); *H04N 21/858* (2013.01)

(58) Field of Classification Search
CPC ........ H04L 45/00; H04L 47/10; H04L 49/351
USPC .................. 370/252, 389, 386, 487
See application file for complete search history.

(56) References Cited

U.S. PATENT DOCUMENTS

| 5,734,413 A | 3/1998 | Lappington et al. .......... 726/141 |
| 5,809,143 A | 9/1998 | Hughes |

(Continued)

FOREIGN PATENT DOCUMENTS

| JP | 2004-500770 A | 1/2004 |
| WO | WO-9966381 | 12/1999 |

(Continued)

OTHER PUBLICATIONS

Japanese Patent Office, Japanese Office Action issued in corresponding JP Application No. 2011-533325, dated Oct. 29, 2013.

(Continued)

*Primary Examiner* — John Pezzlo
(74) *Attorney, Agent, or Firm* — Sughrue Mion, PLLC

(57) ABSTRACT

The invention relates, in various aspects, to systems and methods for linking content stored on a computer network with content broadcast over a television network. The system includes a database, a trigger mechanism, a communications interface, and a packet generator. The database stores tokens representative of links to the stored content and delivery information representative of at least a duration for delivering the token. The trigger mechanism indicates an instruction to deliver a token over the television network, generating a signal indicating a respective one of the stored tokens and a time for starting the delivery of the respective token. The communications interface has a channel in communication with a television, set top box device for transferring the respective token to the television set top box device. The packet generator generates packets within a stream of television content to be broadcast over the television network.

30 Claims, 5 Drawing Sheets

(51) Int. Cl.
  *H04N 7/173* (2011.01)
  *H04N 21/462* (2011.01)
  *H04N 21/4722* (2011.01)
  *H04N 21/858* (2011.01)
  *H04J 1/16* (2006.01)

(56) References Cited

U.S. PATENT DOCUMENTS

| | | | |
|---|---|---|---|
| 5,835,740 A | 11/1998 | Wise et al. | |
| 5,842,033 A | 11/1998 | Wise et al. | |
| 5,878,273 A | 3/1999 | Wise et al. | |
| 5,948,040 A | 9/1999 | DeLorme et al. | |
| 5,956,519 A | 9/1999 | Wise et al. | |
| 6,018,776 A | 1/2000 | Wise et al. | |
| 6,035,126 A | 3/2000 | Wise et al. | |
| 6,039,688 A | 3/2000 | Douglas et al. | |
| 6,047,112 A | 4/2000 | Wise et al. | |
| 6,067,417 A | 5/2000 | Wise et al. | |
| 6,134,318 A | 10/2000 | O'Neil | |
| 6,178,446 B1 | 1/2001 | Gerszberg et al. | 709/217 |
| 6,263,422 B1 | 7/2001 | Wise et al. | |
| 6,270,011 B1 | 8/2001 | Gottfried | |
| 6,272,176 B1 | 8/2001 | Srinivasan | |
| 6,327,619 B1 | 12/2001 | Blumenau | |
| 6,330,665 B1 | 12/2001 | Wise et al. | |
| 6,338,043 B1 | 1/2002 | Miller | |
| 6,357,042 B2 | 3/2002 | Srinivasan et al. | 725/32 |
| 6,360,206 B1 | 3/2002 | Yamashita | |
| 6,385,596 B1 | 5/2002 | Wiser et al. | |
| 6,418,470 B2 | 7/2002 | Blumenau | |
| 6,434,621 B1 | 8/2002 | Pezzillo et al. | |
| 6,460,079 B1 | 10/2002 | Blumenau | |
| 6,463,466 B1 | 10/2002 | Weyer | |
| 6,507,727 B1 | 1/2003 | Henrick | |
| 6,543,052 B1 | 4/2003 | Ogasawara | |
| 6,546,413 B1 | 4/2003 | Northrup | |
| 6,615,185 B1 | 9/2003 | Bernstein | |
| 6,711,256 B1 | 3/2004 | O'Neil | |
| 6,758,391 B1 | 7/2004 | Pickens, III | |
| 6,760,916 B2 | 7/2004 | Holtz et al. | |
| 6,769,127 B1 | 7/2004 | Bonomi et al. | |
| 6,847,936 B2 | 1/2005 | Fang et al. | |
| 6,868,403 B1 | 3/2005 | Wiser et al. | |
| 6,901,436 B1 | 5/2005 | Schneider | |
| 6,901,606 B2 | 5/2005 | Wright et al. | |
| 6,918,113 B2 | 7/2005 | Patel et al. | |
| 6,925,458 B2 | 8/2005 | Scaturro et al. | |
| 6,937,996 B1 | 8/2005 | Forsythe et al. | |
| 6,938,015 B2 | 8/2005 | Joshi et al. | |
| 6,957,041 B2 | 10/2005 | Christensen et al. | |
| 6,963,898 B2 | 11/2005 | Yoshimine et al. | |
| 6,970,886 B1 | 11/2005 | Conwell et al. | |
| 6,985,882 B1 | 1/2006 | Del Sesto | |
| 7,003,500 B1 | 2/2006 | Driessen | |
| 7,051,029 B1 | 5/2006 | Fayyad et al. | |
| 7,065,497 B1 | 6/2006 | Brewster et al. | |
| 7,065,557 B2 | 6/2006 | Sowden et al. | |
| 7,103,557 B2 | 9/2006 | Middeljans et al. | |
| 7,103,908 B2 | 9/2006 | Tomsen | |
| 7,200,868 B2 | 4/2007 | Mattox et al. | |
| 7,222,363 B2 | 5/2007 | Rice et al. | |
| 7,240,365 B2 | 7/2007 | de Jong et al. | |
| 7,275,156 B2 | 9/2007 | Balfanz et al. | |
| 7,299,292 B2 | 11/2007 | Morten et al. | |
| 8,307,392 B2 | 11/2012 | Ahanger et al. | |
| 8,668,403 B2 | 3/2014 | Sawyer | |
| 2001/0003099 A1 | 6/2001 | Von Hohorn | |
| 2001/0014868 A1 | 8/2001 | Herz et al. | |
| 2001/0025255 A1 | 9/2001 | Gaudian | |
| 2001/0029478 A1 | 10/2001 | Laster et al. | |
| 2001/0034219 A1 | 10/2001 | Hewitt et al. | |
| 2001/0037314 A1 | 11/2001 | Ishikawa | |
| 2001/0042010 A1 | 11/2001 | Hassell | |
| 2001/0049617 A1 | 12/2001 | Berenson et al. | |
| 2002/0010757 A1 | 1/2002 | Granik et al. | |
| 2002/0013727 A1 | 1/2002 | Lee | |
| 2002/0016848 A1 | 2/2002 | Yoshimine et al. | |
| 2002/0026359 A1 | 2/2002 | Long et al. | |
| 2002/0026420 A1 | 2/2002 | DuPhily | |
| 2002/0032603 A1 | 3/2002 | Yeiser | |
| 2002/0049037 A1 | 4/2002 | Christensen et al. | |
| 2002/0053078 A1 | 5/2002 | Holtz et al. | |
| 2002/0059632 A1 | 5/2002 | Link et al. | 725/108 |
| 2002/0065034 A1 | 5/2002 | Zhang | |
| 2002/0065715 A1 | 5/2002 | Tennyson et al. | |
| 2002/0078033 A1 | 6/2002 | Scaturro et al. | |
| 2002/0078446 A1 | 6/2002 | Dakss et al. | |
| 2002/0083005 A1 | 6/2002 | Lowenstein et al. | |
| 2002/0091544 A1 | 7/2002 | Middeljans et al. | |
| 2002/0094866 A1 | 7/2002 | Takeda et al. | |
| 2002/0094868 A1 | 7/2002 | Tuck et al. | |
| 2002/0095387 A1 | 7/2002 | Sosa et al. | |
| 2002/0099564 A1 | 7/2002 | Kim et al. | |
| 2002/0103675 A1 | 8/2002 | Vanelli | |
| 2002/0104090 A1 | 8/2002 | Stettner | |
| 2002/0104099 A1 | 8/2002 | Novak | |
| 2002/0111865 A1 | 8/2002 | Middleton et al. | |
| 2002/0112035 A1 | 8/2002 | Carey et al. | |
| 2002/0123956 A1 | 9/2002 | Galuten | |
| 2002/0129002 A1 | 9/2002 | Alberts et al. | |
| 2002/0129356 A1 | 9/2002 | Hellerstein et al. | |
| 2002/0129359 A1 | 9/2002 | Lichner | |
| 2002/0138364 A1 | 9/2002 | Katagiri et al. | |
| 2002/0147645 A1 | 10/2002 | Alao et al. | |
| 2002/0149559 A1 | 10/2002 | Sowden et al. | |
| 2002/0151327 A1 | 10/2002 | Levitt | |
| 2002/0156866 A1 | 10/2002 | Schneider | |
| 2002/0174425 A1 | 11/2002 | Markel et al. | |
| 2002/0198786 A1 | 12/2002 | Tripp et al. | |
| 2003/0003990 A1 | 1/2003 | Von Kohorn | |
| 2003/0004787 A1 | 1/2003 | Tripp et al. | |
| 2003/0004882 A1 | 1/2003 | Holler et al. | |
| 2003/0028429 A1 | 2/2003 | Mittman et al. | |
| 2003/0040838 A1 | 2/2003 | Lagunzad et al. | |
| 2003/0046083 A1 | 3/2003 | Devinney, Jr. et al. | |
| 2003/0052905 A1 | 3/2003 | Gordon et al. | |
| 2003/0056210 A1 | 3/2003 | Joshi et al. | |
| 2003/0060157 A1 | 3/2003 | Henrick | |
| 2003/0083929 A1 | 5/2003 | Springer et al. | |
| 2003/0101101 A1 | 5/2003 | Fang | |
| 2003/0110080 A1 | 6/2003 | Tsutani et al. | |
| 2003/0126275 A1 | 7/2003 | Mungavan et al. | |
| 2003/0149781 A1 | 8/2003 | Yared et al. | |
| 2003/0154142 A1 | 8/2003 | Ginsburg et al. | |
| 2003/0159566 A1 | 8/2003 | Sater et al. | |
| 2003/0164557 A1 | 9/2003 | Chung et al. | |
| 2003/0172374 A1 | 9/2003 | Vinson et al. | |
| 2003/0177101 A1 | 9/2003 | Ferris | |
| 2003/0187953 A1 | 10/2003 | Pearson et al. | |
| 2003/0195806 A1 | 10/2003 | Willman et al. | |
| 2003/0195842 A1 | 10/2003 | Reece | |
| 2003/0226141 A1 | 12/2003 | Krasnow et al. | |
| 2003/0229536 A1 | 12/2003 | House et al. | |
| 2003/0234819 A1 | 12/2003 | Daly et al. | |
| 2004/0009858 A1 | 1/2004 | Tamaribuchi | |
| 2004/0010806 A1 | 1/2004 | Yuen et al. | |
| 2004/0015401 A1 | 1/2004 | Lee et al. | |
| 2004/0044535 A1 | 3/2004 | Conner et al. | |
| 2004/0046977 A1 | 3/2004 | Silverbrook et al. | |
| 2004/0052377 A1 | 3/2004 | Mattox et al. | |
| 2004/0054589 A1 | 3/2004 | Nicholas et al. | |
| 2004/0054628 A1 | 3/2004 | de Jong et al. | |
| 2004/0054629 A1 | 3/2004 | de Jong et al. | |
| 2004/0054634 A1 | 3/2004 | Tak | |
| 2004/0054750 A1 | 3/2004 | de Jong et al. | |
| 2004/0054915 A1 | 3/2004 | Jong et al. | |
| 2004/0059629 A1 | 3/2004 | Luo et al. | |
| 2004/0059939 A1 | 3/2004 | de Jong | |
| 2004/0062379 A1 | 4/2004 | O'Neil | |
| 2004/0073688 A1 | 4/2004 | Sampson | |
| 2004/0078604 A1 | 4/2004 | Rice et al. | |
| 2004/0083133 A1 | 4/2004 | Nicholas et al. | |
| 2004/0083215 A1 | 4/2004 | de Jong | |
| 2004/0088328 A1 | 5/2004 | Cook et al. | |

(56) References Cited

U.S. PATENT DOCUMENTS

| | | |
|---|---|---|
| 2004/0088420 A1 | 5/2004 | Allen et al. |
| 2004/0117248 A1 | 6/2004 | Dutta et al. |
| 2004/0117269 A1 | 6/2004 | Karaoguz et al. |
| 2004/0117303 A1 | 6/2004 | Gamboa |
| 2004/0117827 A1 | 6/2004 | Karaoguz et al. |
| 2004/0117838 A1 | 6/2004 | Karaoguz et al. |
| 2004/0117842 A1 | 6/2004 | Karaoguz et al. |
| 2004/0122735 A1 | 6/2004 | Meshkin |
| 2004/0128257 A1 | 7/2004 | Okamoto et al. |
| 2004/0128364 A1 | 7/2004 | Clark |
| 2004/0128516 A1 | 7/2004 | Okamoto et al. |
| 2004/0133518 A1 | 7/2004 | Dryall |
| 2004/0133782 A1 | 7/2004 | Sander et al. |
| 2004/0139156 A1 | 7/2004 | Matthews et al. |
| 2004/0139318 A1 | 7/2004 | Fiala et al. |
| 2004/0182940 A1 | 9/2004 | Biller |
| 2004/0204952 A1 | 10/2004 | Rochet |
| 2004/0221163 A1 | 11/2004 | Jorgensen et al. |
| 2004/0221183 A1 | 11/2004 | Lu |
| 2004/0225386 A1 | 11/2004 | Thompson et al. |
| 2004/0230797 A1 | 11/2004 | Ofek et al. |
| 2004/0235567 A1 | 11/2004 | Chatani |
| 2004/0236860 A1* | 11/2004 | Logston et al. ............. 709/230 |
| 2004/0237100 A1 | 11/2004 | Pinder et al. |
| 2004/0249707 A1 | 12/2004 | Park |
| 2005/0010473 A1 | 1/2005 | McLaughlin |
| 2005/0010758 A1 | 1/2005 | Landrock et al. |
| 2005/0010957 A1 | 1/2005 | Muller et al. |
| 2005/0024689 A1 | 2/2005 | House et al. |
| 2005/0027598 A1 | 2/2005 | Greiner |
| 2005/0038702 A1 | 2/2005 | Merriman et al. |
| 2005/0038749 A1 | 2/2005 | Fitch et al. |
| 2005/0086683 A1 | 4/2005 | Meyerson .................. 725/30 |
| 2005/0091107 A1 | 4/2005 | Blum |
| 2005/0111663 A1 | 5/2005 | Lotspiech et al. |
| 2005/0120125 A1 | 6/2005 | Morten et al. |
| 2005/0131834 A1 | 6/2005 | Rodriguez et al. |
| 2005/0138560 A1 | 6/2005 | Lee et al. |
| 2005/0144020 A1 | 6/2005 | Muzaffar et al. |
| 2005/0144126 A1 | 6/2005 | Commodore et al. |
| 2005/0171897 A1 | 8/2005 | Forsythe et al. |
| 2005/0182956 A1 | 8/2005 | Ginter et al. |
| 2005/0185398 A1 | 8/2005 | Scannell |
| 2005/0188853 A1 | 9/2005 | Scannell |
| 2005/0204019 A1 | 9/2005 | Flynn et al. |
| 2005/0229209 A1 | 10/2005 | Hildebolt et al. |
| 2005/0230038 A1 | 10/2005 | Guckert et al. |
| 2005/0234789 A1 | 10/2005 | Czyzewski et al. |
| 2005/0239495 A1 | 10/2005 | Bayne |
| 2005/0267805 A1 | 12/2005 | Tarantino |
| 2005/0283791 A1 | 12/2005 | McCarthy et al. |
| 2005/0289002 A1 | 12/2005 | Mathis, Jr. |
| 2005/0289630 A1 | 12/2005 | Andrews et al. |
| 2006/0015727 A1 | 1/2006 | Birk et al. |
| 2006/0020523 A1 | 1/2006 | Song |
| 2006/0020548 A1 | 1/2006 | Flather |
| 2006/0031153 A1 | 2/2006 | Kim |
| 2006/0031499 A1 | 2/2006 | Yoshimine et al. |
| 2006/0031500 A1 | 2/2006 | Yoshimine et al. |
| 2006/0031501 A1 | 2/2006 | Yoshimine et al. |
| 2006/0031502 A1 | 2/2006 | Yoshimine et al. |
| 2006/0036484 A1 | 2/2006 | Voticky |
| 2006/0036742 A1 | 2/2006 | Yoshimine et al. |
| 2006/0041480 A1 | 2/2006 | Briggs |
| 2006/0046945 A1 | 3/2006 | Herdt et al. |
| 2006/0053051 A1 | 3/2006 | Goodman |
| 2006/0053067 A1 | 3/2006 | Driessen |
| 2006/0059053 A1 | 3/2006 | Payne |
| 2006/0068758 A1 | 3/2006 | Dharmadhikari et al. |
| 2006/0069612 A1 | 3/2006 | Hurt et al. |
| 2006/0080170 A1 | 4/2006 | Roach et al. |
| 2006/0080172 A1 | 4/2006 | Najarian et al. |
| 2006/0089843 A1 | 4/2006 | Flather |
| 2006/0089875 A1 | 4/2006 | Park et al. |
| 2006/0095337 A1 | 5/2006 | Morgan |
| 2006/0101489 A1 | 5/2006 | Roden et al. |
| 2006/0116924 A1 | 6/2006 | Angles et al. |
| 2006/0123053 A1 | 6/2006 | Scannell |
| 2006/0123449 A1 | 6/2006 | Ma et al. |
| 2006/0129490 A1 | 6/2006 | Collar et al. |
| 2006/0129502 A1 | 6/2006 | Pastusiak et al. |
| 2006/0136335 A1 | 6/2006 | Ferguson |
| 2006/0143084 A1 | 6/2006 | Donnelli et al. |
| 2006/0148454 A1 | 7/2006 | Welch |
| 2006/0154642 A1 | 7/2006 | Scannell |
| 2006/0156409 A1 | 7/2006 | Chladek |
| 2006/0190616 A1 | 8/2006 | Mayerhofer et al. |
| 2006/0206912 A1 | 9/2006 | Klarfeld et al. |
| 2006/0219776 A1 | 10/2006 | Finn |
| 2006/0230415 A1 | 10/2006 | Roeding .................. 726/34 |
| 2006/0272022 A1 | 11/2006 | Loukianov et al. |
| 2007/0016918 A1 | 1/2007 | Alcorn et al. |
| 2007/0088812 A1 | 4/2007 | Clark |
| 2007/0089137 A1 | 4/2007 | Clark |
| 2007/0089157 A1 | 4/2007 | Clark |
| 2007/0089158 A1 | 4/2007 | Clark |
| 2007/0156611 A1 | 7/2007 | Gupta et al. |
| 2007/0156890 A1 | 7/2007 | Promny |
| 2007/0157251 A1 | 7/2007 | Shrivastava et al. ........... 725/60 |
| 2007/0162967 A1 | 7/2007 | de Jong et al. |
| 2007/0169189 A1 | 7/2007 | Crespo |
| 2007/0198436 A1 | 8/2007 | Weiss |
| 2007/0204044 A1 | 8/2007 | Rice et al. |
| 2007/0241189 A1 | 10/2007 | Slavin et al. |
| 2007/0250901 A1 | 10/2007 | McIntire et al. .............. 725/148 |
| 2007/0288951 A1 | 12/2007 | Ray et al. |
| 2008/0006002 A1 | 1/2008 | Strickland et al. |
| 2008/0046945 A1 | 2/2008 | Hanley |
| 2008/0060002 A1 | 3/2008 | Noll et al. |
| 2008/0114648 A1 | 5/2008 | Chen et al. |
| 2008/0134043 A1 | 6/2008 | Georgis et al. |
| 2008/0288600 A1 | 11/2008 | Clark |
| 2008/0307454 A1 | 12/2008 | Ahanger et al. |
| 2009/0019061 A1 | 1/2009 | Scannell, Jr. |
| 2009/0199230 A1 | 8/2009 | Kumar et al. .................... 725/32 |
| 2011/0225417 A1* | 9/2011 | Maharajh et al. ............. 713/150 |

FOREIGN PATENT DOCUMENTS

| | | |
|---|---|---|
| WO | WO-9966381 A2 | 12/1999 |
| WO | WO-0116900 | 3/2001 |
| WO | WO-0116900 A2 | 3/2001 |
| WO | WO-0127788 | 4/2001 |
| WO | WO-0127788 A1 | 4/2001 |
| WO | WO-0133501 | 5/2001 |
| WO | WO-0133501 A1 | 5/2001 |
| WO | WO-0150429 | 7/2001 |
| WO | WO-0150429 A1 | 7/2001 |
| WO | 01/65832 A1 | 9/2001 |
| WO | WO-0213073 | 2/2002 |
| WO | WO-0213073 A1 | 2/2002 |
| WO | WO 02/35822 | 5/2002 |
| WO | WO-02052813 | 7/2002 |
| WO | WO-02052813 A2 | 7/2002 |
| WO | WO-03015370 | 2/2003 |
| WO | WO-03015370 A2 | 2/2003 |
| WO | WO-03025720 | 3/2003 |
| WO | WO-03025720 A2 | 3/2003 |
| WO | WO-03093961 | 11/2003 |
| WO | WO-03093961 A2 | 11/2003 |
| WO | WO-04031899 A2 | 4/2004 |
| WO | WO-2004031899 | 4/2004 |
| WO | WO-2004038997 | 5/2004 |
| WO | WO-04038997 A1 | 6/2004 |
| WO | WO-2004099940 | 11/2004 |
| WO | WO-2004099940 A2 | 11/2004 |
| WO | WO-2005001618 | 1/2005 |
| WO | WO-2005001618 A2 | 1/2005 |
| WO | WO-2006002238 | 1/2006 |
| WO | WO-2006002238 A2 | 1/2006 |
| WO | WO-2006014721 | 2/2006 |
| WO | WO-2006014721 A2 | 2/2006 |
| WO | WO-2006030410 | 3/2006 |
| WO | WO-2006030410 A2 | 3/2006 |

(56) References Cited

FOREIGN PATENT DOCUMENTS

| WO | WO-2006039053 | | 4/2006 |
|---|---|---|---|
| WO | WO-2006039053 | A2 | 4/2006 |
| WO | WO-2008061184 | | 5/2006 |
| WO | WO-2006059140 | | 6/2006 |
| WO | WO-2006059140 | A1 | 6/2006 |
| WO | WO-2006084278 | A2 | 6/2006 |
| WO | WO-2006073489 | | 7/2006 |
| WO | WO-2006073489 | A1 | 7/2006 |
| WO | WO-2006084278 | | 8/2006 |
| WO | WO-2007046020 | | 4/2007 |
| WO | WO-2007084851 | | 7/2007 |
| WO | WO-2007084851 | A2 | 7/2007 |
| WO | WO-2007125486 | | 11/2007 |
| WO | WO-2007125486 | A2 | 11/2007 |
| WO | WO-2007144852 | | 12/2007 |
| WO | WO-2007144852 | A2 | 12/2007 |
| WO | WO-2007145687 | | 12/2007 |
| WO | WO-2007145687 | A1 | 12/2007 |
| WO | WO-2008061184 | | 5/2008 |
| WO | WO-2009075755 | | 6/2009 |
| WO | WO 2009075755 | A2 | 6/2009 |

OTHER PUBLICATIONS

International Search Report and Written Opinion dated Feb. 22, 2010 in International Application No. PCT/US2009/061648.

"Interactivity takes major step for broadcasters", BroadcastEngineering, http:/www.broadcastengineering.com/news/interactivity-major-step-broadcasters-08256/index.html, retrieved from the Internet on Feb. 8, 2010.

"Media Object Server (MOSà) Protocol v2.6", http://www.mosprotocol.com/MOS%20Files/mosv26.htm, retrieved from the Internet on Feb. 8, 2010.

International Search Report dated Feb. 4, 2009 in International Application No. PCT/US08/13292.

"Update TV® Technology Overview", UpdateLogic, Incorporated, http://www.updatelogic.com/technology.html , printed from the Internet Apr. 28, 2009.

"The Pearl by Nexnet", retrieved from the internet at http://www.thenexnet.com/ on May 28, 2009.

"Update TV® Technology Overview", UpdateLogic, Incorporated, <http://www.updatelogic.com/technology.html>, printed from the Internet Apr. 28, 2009.

"The Pearl by Nexnet", retrieved from the internet at http://www.thenexnet.com/ on May 26, 2009.

International Search Report and Written Opinion dated Feb. 22, 2010 in International Application No. PCT/US2006/061648.

"Interactivity takes major step for broadcasters", BroadcastEngineering, http:/www.broadcastengineering.com/news/interactivity-major-step-broadcasters-08256/index, retrieved from the Internet on Feb. 8, 2010.

"Media Object Server (MOSa) Oriticik v2.6", retrieved from the Internet http://www.mosprotocol.com/MOS%20Files/mosv26.htm on Feb. 8, 2010.

International Search Report and Written Opinion datedd Feb. 22, 2010 in International Application No. PCT/US2009/061648.

"International takes major step for broadcasters", BroadcastEngineering, http:/www.broadcastengineering.com/news/interactivity-major-step-broadcasters-08256/index.html, retrieved from the Internet on Feb. 8, 2010.

"Media Object Server (MOSä) Protocol v2.6", http://www.mostprotocol.com/MOS%20Files/mosv26.htm, retrieved from the Internet on Feb. 8, 2010.

* cited by examiner

```
<tids>
  <tid vertical_pos="83" uuid="CVB_10000001021" total_time_millis="84000" tid_interval_millis="1000" reportonly="false" icon_type="1" horizontal_pos="83">
    <icon_schedule toMillis="79000" fromMillis="3000" action="display" />
    <icon_schedule toMillis="84000" fromMillis="80000" action="hide" />
  </tid>
</tids>
```

SYSTEMS AND METHODS FOR PROVIDING A NETWORK LINK BETWEEN BROADCAST CONTENT AND CONTENT LOCATED ON A COMPUTER NETWORK

CROSS-REFERENCE TO RELATED APPLICATIONS

This application is a continuation of U.S. patent application Ser. No. 12/603,897, filed Oct. 22, 2009, which is a continuation-in-part of and claims priority to U.S. patent application Ser. No. 12/288,672, filed Oct. 22, 2008, the contents of which are incorporated herein by reference in their entireties.

FIELD OF THE INVENTION

The systems and methods described herein generally pertain to data distribution networks and more particularly to data networks that link tracking content residing in different classes of distribution networks.

BACKGROUND

Today, there are many different types of data networks, having different topologies and different data functions. Broadcast networks, such as television and radio networks have now switched largely to a digital data network. These networks use an infrastructure suited for storing a relatively small number of extremely large data files that are distributed to a large number of users. Additionally, these networks provide little or no support of a backchannel from the user to the broadcasting server. In contrast, data networks that support data communications between computer and workstations have storage suited for storing an extremely large number of relatively small files and a topology and architecture for routing data quickly between devices on the network, typically providing each computer with an equal share of resources for transmitting data. Of these types of data networks, probably the most well known is the Internet.

The growth of the Internet has been so significant that it has challenged the vitality and significance of the television and radio networks as medium for content delivery. The television network is better suited for broadcast deliveries of television content. However, the Internet provides content that attracts viewers, and at the same time provides a data processing platform that allows the viewer to instantly select content and agree to purchases. A concrete result of the difference between the television and radio network technology and computer data network technology is that, a consumer watching content over the Internet can be presented with an advertisement carrying an interactive link that the user can select like any other web link. Based on that selection, the consumer can buy a product or at least request additional information about the product from the retailer. Many advertisers see this as a better platform. With the Internet data network, an advertiser can simultaneously present both an ad and a mechanism to purchase the product, reaching the consumer while the advertisement is on their mind.

Consequently, the economic future of the television and radio networks as an advertising medium will depend upon joining the those platforms to the Internet platform. Additionally, the value of the television and radio networks as a communication tool would also be increased by a viable network technology that brought the interactivity of a computer data network to the broadcast capabilities of the television network. For example, emergency alerts that are broadcast over the television network may have increased effectiveness if they are combined with an easy way for viewers to request and get more specific information, such as downloadable maps of evacuation routes, information on missing persons and other life saving safety information. To this end, many companies and groups are working on this issue and are developing network technologies that allow for two way communications, including two-vsray communications over the cable-TV network.

These technologies merely increase the bi-directional communication capabilities of the cable TV platform. However, it is unclear that simply adding improved communication technology will allow the television platform to compete successfully against Internet advertising systems. These systems allow Internet-like advertising, such as linkable content, to be carried over the cable-TV platform. In essence, the proposed systems only extend low quality Internet banner ads and pop-up notices to the TV viewing experience. Thus these proposed solutions fail to address the existing technologies and platforms for developing and distributing advertising content over the television network. Further, these technologies exist only in the cable television environment while programmers, advertisers and safety officials desire a solution that operates in all television distribution environments.

For television and radio systems to compete against the Internet, technology needs to be developed that extends the interactivity and accountability of the Internet to the TV and radio mediums, in a manner that fits with the existing structure of television and radio advertising.

As such there remains a need for systems and methods that provide an improved platform for allowing data content on a computer network to be linked with content on a broadcast network.

SUMMARY OF THE INVENTION

The systems and methods described herein pertain, among other things, to a data network system that includes a data stream server that inserts a token into a broadcast media stream at a point in the network where that stream is ready to be delivered to a network node. The token provides a data pointer that links, typically by creating a logical link, the broadcast media stream, or a portion of the broadcast media stream, to content stored on a data network. The network system tracks the broadcast content that is queued, scheduled or otherwise organized to be delivered over the television network. At a selected time, the network system triggers the data stream server to insert into the broadcast stream the token, or optionally, a series of tokens. These tokens in one embodiment are inserted into a transport stream of data packets being broadcast to a series of network nodes. Preferably, the data stream server is located at a point in the network that is subsequent to any processing of the broadcast media stream that may result in the inserted packets being stripped from the broadcast media stream. The inserted tokens may be processed by a television content receiver to create a visual representation of the logical link. The link may be activated to create a request for the associated content that is stored on the data network, and the content may be delivered to a destination associated with the source of the request.

Accordingly, the systems and methods described herein in one aspect, provide a network including systems that link data served on a broadcast network, including broadcast networks employing transport stream data transmission with data maintained on an internet protocol packet switched network.

In another aspect, the systems and methods described herein pertain to a data stream server that modifies a broadcast media stream to add into that stream tokens that specifically identify the location of portions of content in the stream and that further link those portions of content with data stored on a computer network.

To this end, and in certain embodiments, the system includes a data packet generator that generates data packets carrying token information. The data packet generator operates responsive to a trigger control signal that directs the data packet generator to select a particular token or tokens for the data packets. To select the correct tokens, the packet generator processes the trigger control signal to identify database access data. The packet generator accesses a database having stored therein data that provides the packet generator with instructions for creating the appropriate packets to have inserted into the broadcast media stream. These instructions include the computer network content, or data that represents or otherwise points to the computer network content, to associate with the respective broadcast media stream content and may include a start and stop instruction indicating for example a time for starting the insertion of data packets into the broadcast media stream and similarly for stopping the insertion of data packets into the broadcast media stream. Additional instructions may include instructions for periodically changing to token data being inserted into the broadcast media stream, as well as information indicating how often data packets are to be inserted into the broadcast media stream while packet insertion is active between the start time and the stop time.

One aspect described herein includes methods that generate content for the video and/or audio components of the broadcast media stream and similarly generate content for the meta data component of the broadcast media stream. The system separates the generated content and combines the generated content later during the content distribution process. In one practice, the method stores meta data content in a database, such as the database described above, that stores data accessed by the packet generator.

In another aspect, a system for linking content stored on a computer network with content broadcast over a television network is provided. The system includes one or more broadcast data stream servers (BDSSs). Each BDSS includes a database storing tokens representative of links between the content broadcast over the television network and the content stored on a computer network, and accesses delivery information representative of at least a duration for delivering the token. The tokens are authorized for use by a token registry. The token registry allows for creating a respective token, registering the respective token, assembling one or more tokens into a token playlist, and storing the respective token and playlist in the database. The token registry also allows a content producer to at least one of create the respective token and track the respective token.

The system further includes a trigger mechanism for indicating an instruction to deliver a playlist of tokens over the television network, the trigger mechanism generating a signal indicating the respective playlist of tokens and indicating a time for starting the delivery of the playlist of tokens, wherein the playlist of tokens includes at least one of the respective token and a time for starting the delivery of the respective token. In some embodiments, the trigger mechanism interacts with the automation system to create and distribute a playout list representative of a schedule of time slots with associated programming content for the time slots. In some embodiments, the trigger mechanism includes a scheduled playout system having a data file representative of a time schedule for delivering respective ones of the tokens. In some embodiments, the trigger mechanism includes a switch of the type operated by a user and coupled to the broadcast data stream server. In some embodiments, the trigger mechanism includes means for identifying within a program stream a pointer representative of a token playlist and responding to the identification of the pointer by having the packet generator insert the respective tokens into the stream of television content. In some embodiments, the trigger mechanism includes an instruction from a second broadcast data stream server in at least one of the computer network and the television network.

The system also includes a communications interface having a channel in communication with a television set top box device for transferring the respective token to the television set top box device.

The system also includes a packet generator for generating the packets within a stream of television content to be broadcast over the television network, and a multiplexer coupled to the packet generator and the server for multiplexing a set of tokens stored in the database with the stream of television content. In some embodiments, the packet generator generates data packets carrying the token data. In some embodiments, the packet generator generates packets conforming to the MPEG-2 transport stream standard. In some embodiments, the packet generator generates packets having token data and inserts said packets into a private data section or packetized elementary stream associated with a program of a transport stream and being representative of the content being broadcast over the television network.

In some embodiments, the system further includes an identifier control coupled to the packet generator thr controlled insertion of packets carrying token data into a selected port identified to the set top box devices associated with a respective broadcaster. The identifier control includes means for inserting packets carrying token data to two or more different ports of a set top box device.

In some embodiments, the system further includes an automation system for managing delivery of content to the multiplexer whereby content from the broadcast data stream server and content delivery triggered by the automation system is transformed into a stream of intermixed packages.

In some embodiments, the set of tokens includes an identifier carrying data representative of at least one of a network location of the packet generator, a date for inserting the respective token into the stream, a time for inserting the respective token into the stream, and an application or script that the set top box can execute, and for inserting such data packets into the stream of television content being broadcast to the set top box devices.

In some embodiments, the system further includes a feedback monitor for monitoring the intermixed stream of television content being broadcast to the set top box devices for verifying that the inserted token data is associated with the respective television content.

In some embodiments, the system further includes a time stamp for stamping data packets carrying token data to the user site to mark portions of the television content with timing information.

In another aspect, a method for linking a content stored on a computer network with content broadcast over a television network is provided. The method includes analyzing a television network and identifying a network location being adjacent to a channel directly coupling to a user site.

The method further includes locating a communications interface at the identified location and coupling the communications interface to the channel in communication with the user site.

The method further includes providing a broadcast data stream server including a database storing a plurality of tokens representative of links between the content broadcast over a television network and the content stored on a computer network, and accessing delivery information representative of at least a duration for delivering a respective token.

The method further includes providing a token registry for creating the respective token, registering the respective token, assembling one or more tokens into a token playlist, and storing the respective token and the token playlist in the database.

The method further includes allowing a content producer to at least one of create the respective token and track the respective token.

The method further includes triggering delivery of the token playlist over the television network, wherein triggering causes a packet generator at the communications interface to interface with a multiplexer and the server to multiplex a set of tokens stored in the database with packets within a stream of television content to be broadcast over the television network, wherein the packet generator generates the packets within the stream of television content, and wherein the token playlist includes at least one of the respective token and a time for starting the delivery of the respective token. In some embodiments, the set of tokens includes an identifier carrying data representative of at least one of a network location of the packet generator, a date for inserting the respective token into the stream, a time for inserting the respective token into the stream, and an application or script that the set top box can execute.

In some embodiments, the method further comprises monitoring the television content being delivered to the user site and coordinating the delivery of the television content with triggering delivery of the respective token. In some embodiments, monitoring includes monitoring a playlist of scheduled television content, monitoring a command manually generated by an operator, monitoring a command generated by the database, monitoring the television content for previously inserted token trigger data, and monitoring a second broadcast data stream server for insertion instructions.

In some embodiments, the method further includes multiplexing token data with television data to generate an intermixed stream of data for the user site. In some embodiments, the method further includes time stamping data packets carrying token data to the user site for marking portions of the television content with timing information.

In some embodiments, the method further comprises a feedback monitor for reporting the successful insertion of token data.

BRIEF DESCRIPTION OF THE DRAWINGS

The foregoing and other objects and advantages of the invention will be appreciated more fully from the following further description thereof, with reference to the accompanying drawings wherein;

FIG. 2: Depicts a database with XML representations of token data stream;

DESCRIPTION OF THE ILLUSTRATED EMBODIMENTS

Figure 1:
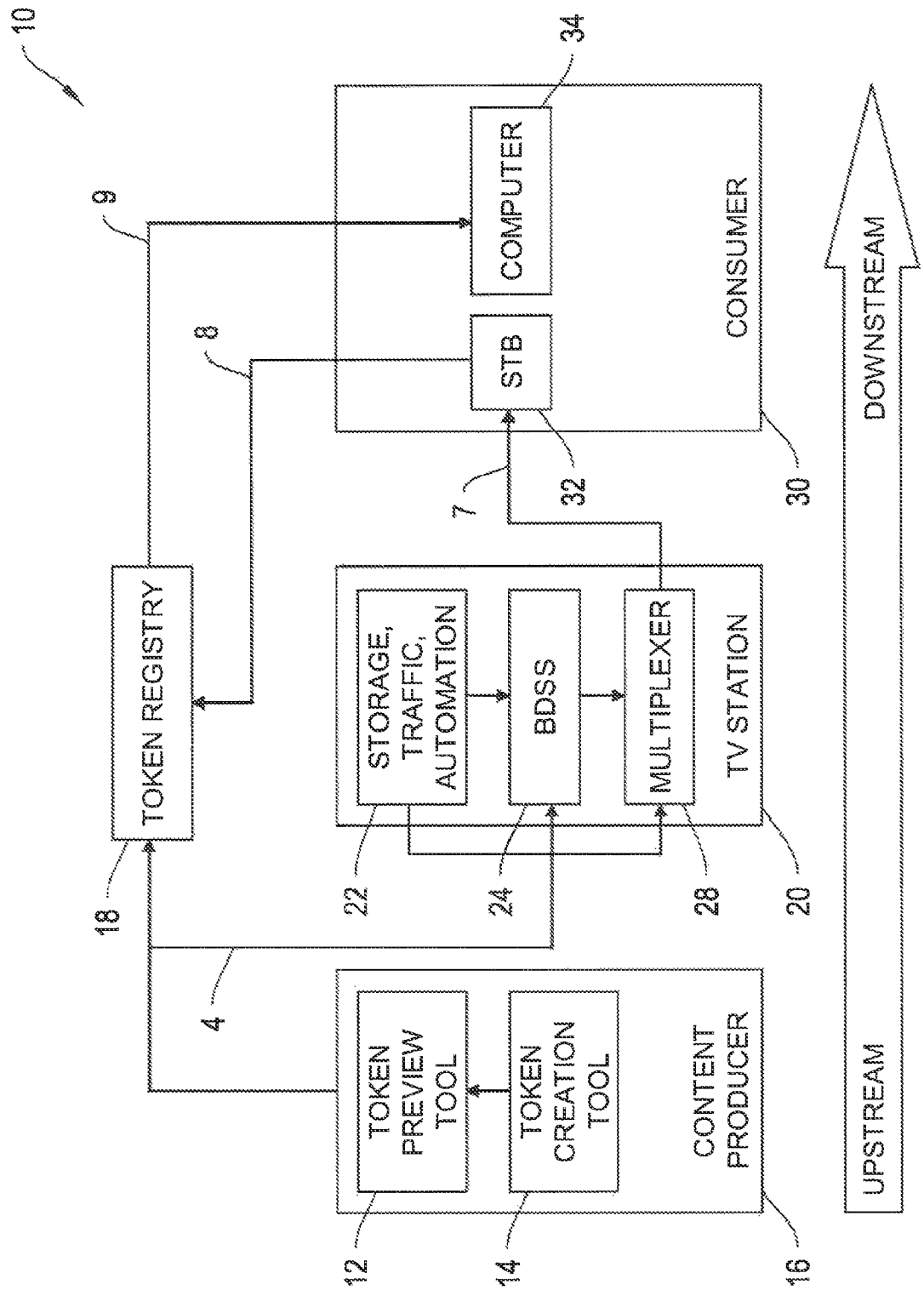
FIG. 1: Depicts a first embodiment of one system according to the invention.

To provide an overall understanding of the systems and methods described herein, certain illustrative embodiments will now be described, including a system that links content within a broadcast media stream with content on a computer network. The network linking systems and methods described herein provide systems that may link advertising content on a computer data network with television content, or portions of television content, being broadcast over a television network. As such, the content linking system allows a content producer that has produced content for broadcast delivery, such as a television show or a commercial, to link with that broadcast content additional and separate content that is stored on a computer network. However, the systems and methods described herein are not so limited and may be used for other applications, including for example, emergency broadcast notification systems that link emergency broadcasts with content stored on a data network. These and other applications, as well as certain modifications, supplements and additions will be apparent to those of skill in the art from the description set forth below.

To this end and in one exemplary embodiment, the systems and methods described herein integrate a data stream server into a television network by, in one practice, placing the data stream server at a location on a broadcast network that is at the point of content delivery to nodes on the television network The data stream server, in one embodiment, is capable of processing the broadcast data stream to insert into the broadcast data stream information representative of links to the content stored on the computer network. The inserted content is placed within the broadcast data stream at a location or a time that corresponds to the location or the time of the broadcast media to which the system wishes to link the content stored on the computer network. Thus, the inserted content, also referred to as tokens herein, provide a logical link to data stored on, or that can be generated on, a data network.

In one particular embodiment, as will be described in more detail hereinafter, the data stream server generates data packets that may be incorporated into an MPEG-2 transport stream. The MPEG-2 transport stream is the broadcast media content that is being delivered to the televisions on a cable network or to other receivers of broadcast media. So, for example, as the MPEG-2 transport stream that carries a television show is transmitted from the television station, that data server that has the links to the content stored on the computer network integrates into the broadcast stream data packets that comply with the metadata packet format for the MPEG-2 transport stream. The data packets in the metadata stream carry information that can be used by the receivers, typically set top boxes, to present to a viewer both the content that makes up the television show being broadcast and an icon that indicates to the viewer that there is content stored on a computer network that is being associated with or somehow related to the content being viewed in the broadcast. In operation, the viewer will be able to activate a control that inputs information to the set top box, and this information is delivered through the back channel on the cable network up into the cable head end. The information delivered back to the cable head end may include the link information to the computer content associated with the broadcast content and optionally and preferably the identifier of the viewer's set top box. The set top box identifier may be any suitable identifier that will identify the set top box that returned the link information to the cable head end. As such, the set top box identifier provides either directly or indirectly information that may be used by the system to derive a destination network address on the linked packet switched network. Thus, the systems described herein provide to the linking system, sufficient information for the linking system to act as a network gateway to mediate data communications, at least unidirectional data communication between two networks employing different data communication protocols. In one particular exemplary embodiment, the link information is used to collect information stored on the computer network and the set top box identifier is employed to deliver that stored computer network information to a portal that the viewer associated with that set top box may later access.

For the purpose of describing the systems and methods, FIG. 1 depicts the content linking system 10 as including elements such as the consumer station 30, which in this depiction includes a receiver 32 and computer 34. Similarly, FIG. 1 depicts a content producer station 16 and token registry 18. Although these elements may optionally be part of a system for linking broadcast media content, such elements are optional. Further, the configuration and arrangement of these elements may vary from that depicted in FIG. 1. For example, the depicted token registry 18 is illustrated as an element separate from the content producer station 16 and separate from the TV station 20. However, in other optional embodiments, the token registry 18 maybe integrated into either the content producer station 16 or the TV station 18. Still other arrangements may be realized, as well as modifications that eliminate or substitute certain of the depicted elements, such as the computer 34 at the consumer station, or the preview tool 12 at the content producer station 16, and the configuration and arrangement selected will depend upon the application being addressed. FIG. 1 further depicts that at the consumer station 30 there are nodes on the television network (the receiver 32) and for the computer data network (the computer 34). In typical operation, these networks operate independently from each other. Further, there typically is no gateway that switches data from the broadcast network to a computer data network. The systems and methods described herein provide such a gateway. With the systems described herein, content broadcast over the television network may be linked to content stored on a computer data network, thereby allowing content distributed over the television network to drive delivery of content over the computer data network. A request packet transmitted over the broadcast television network may be passed on to the computer data network.

Turning back to FIG. 1, it is shown that content producers at station 16 may develop content for distribution over the television network that they wish to link with content either stored on or generated at a computer data network. To this end, the depicted content production station 16 includes the token preview tool 12 and the token creation tool 14. The content production station 16 may be used by a content producer to review content that will be broadcast from the television station 20 to different consumer stations 30 along the television network. Typically, the content producer is a television producer, or an advertiser that is developing the kind of content that is usually distributed over cable television systems such as entertainment programs, or advertisements. However, any person may be a content producer and the actual person choosing to develop content for delivery over the television network will vary depending on the application and the task at hand. For example, developers of emergency alert data for broadcast over the television network may also develop content using the content producer station 16 for the purpose of linking sections of the emergency broadcast content with data on a computer network. The content developed at station 16 is typically content of the type suited for delivery over a television network and usually will be a very large data file consisting of many hundreds of megabytes of data or many gigabytes of data. Additionally, the intended distribution will be to a large number of sites on the television network, all of which will receive the data at about the same time.

In the embodiment depicted in FIG. 1, the content producer station 16 includes a token creation tool 14. As shown in FIG. 1, the token creation tool 14 connects to the token registry 18. The token preview tool 12 also connects to the token registry 18. Using common video play-back and non-linear video editing tools, the content producer can watch the television show that they have produced or that has been given to them and they can watch the show as it progresses through its sequence. At one point, the content producer decides to associate with a portion of that television show some additional content that is stored on a computer network. Thus, for example, during a commercial for an automobile, the content producer may decide to associate a portion of the video being presented to the consumers with content stored on a computer network that represents a coupon for getting a certain amount of money off the purchase of an automobile similar or identical to the automobile being shown in the advertisement. In another example, the content producer may decide to provide a series of tokens that are spaced in time across the content. The tokens may be associated with content stored on the computer network that represents the broadcast content. In one application, these temporarily spaced tokens may be employed to create data packets for transmission over the backchannel of the television network that the systems described herein may process to generate data requests that comply with the communication protocol employed by the computer data network. The systems may switch these generated requests on to the computer data network, and thereby link the two different networks. To this end, the content producer at the content production station 16 enters data into the token creation tool 14 about the content, the start time and duration of an icon that represents to the viewer that content on a computer network has been associated with the video sequence, and specifies what the associated computer network content is. Typically, the presentation of this association directs the consumer to enter some input, typically by activating the user's remote control or through some other device, providing a signal to the consumer's set top box that can be processed by the consumer's set top box to deliver through the back channel on the cable network or on any network, information that is representative of the location of the computer content that has been associated by the content producer with the particular visual sequence the content producer identified in the token creation tool 14. The token creation tool 14 generates a request to the token registry 18 which then generates a token and registers the token with the token registry 18 along with the properties of the token that the content producer 16 has specified.

Once the token has been created and stored in the token registry 18, the content producer may use the token preview tool 12 to simulate the presentation to the consumer of the broadcast content combined with the token data, and simulate the presentation to the consumer of the associated computer network content if a consumer were to click on the token. In one embodiment the token creation tool 14 and the token previewer tool 12 are integrated with a non-linear video editor so that the content producer can view the content, enter the token data, and preview the consumer experience within one user interface. In one embodiment the token preview tool 12 can alter the original video/audio content file by adding meta data representative of the token which the data stream server can detect when the content file is playing out during a broadcast.

The token registry 18 includes a database that stores a unique token ID to the content producer as the content producer is using the token creation tool 14 and that token. ID is uniquely representative of the video information or other information or content that the content producer wishes to associate with content on a computer network. The token registry 18 depicted in FIG. 1 may be a token registry such as that described in U.S. patent application Ser. No. 12/001,633, entitled "Systems and Methods for Registering Token Data on a Computer Network" and owned by the Assignee hereof.

FIG. 1 further depicts a television station 20. The television station includes a multi-part system comprising storage, traffic, and automation systems 22, the data stream server 24, and the multiplexer 28. As shown in FIG. 1, the content producer 16 may communicate with the storage traffic automation system 22. In particular, the content producer 16 may load onto the storage traffic automation system 22 the video content, and optionally the desired schedule for broadcasting it, that the content producer wishes to have broadcast by the television station 20 over the television network, which in this example may be a cable network connected to the consumer station 30. In the embodiment depicted in FIG. 1, there is a single content producer 16 that is delivering content and schedule information to the storage traffic automation system 22. However, in most applications, there will be a number of content producers each of them producing different kinds of content whether its entertainment content, advertiser content or otherwise, and all this content may be stored separately in different locations within the storage traffic automation system 22.

The storage traffic automation system 22 typically includes a play list or other control system that identifies when content stored in the system 22 is to be transmitted from the television station 20 to the consumer station 30. In the embodiment depicted in FIG. 1, the storage traffic automation system 22 will play out its content to the multiplexer 28 and send commands to the multiplexer 28. The storage traffic automation system 22 also sends commands to the data stream server 24, also referred to as a broadcast data stream server (BDSS). The data stream server 24 receives information from the token registry 18 indicating the tokens that are to be associated with certain portions of the television content being played out of the storage traffic automation system 22. The data stream server 24 will generate, in one practice, data packets that can be integrated into the broadcast media stream that makes up the content being delivered from the storage traffic automation system 22 to the consumer station 30. To this end, the television station 20 shown in FIG. 1 includes the multiplexer 28. The multiplexer 28 will multiplex packets generated by the data stream server 24, including a packet generator, with data packets received from the storage traffic automation system 22 so that all packets are delivered as a coherent stream of data to the consumer station 30 so that the consumer can view the broadcast content that will include with it tokens that are representative of the location of content that is being associated with portions of the broadcast media stream. As such, the system multiplexes token data with television data to generate an intermixed stream of data for the user site 30.

The consumer station 30 shown in FIG. 1 couples via path 7 to the multiplexer 28 and via path 9 to the token registry 18. The consumer station 30 is meant to depict a consumer's home that has connections to the cable television network and a separate connection to a computer data network that couples to the computer 34. The television network and the computer network may use the same medium, such as a cable that connects from a cable head end to the consumer's home. However, the two networks are distinct in that the broadcast data over the television network is transmitted in a bandwidth and using a protocol that is different from the bandwidth and protocol used by the computer data network that couples to the computer 34. As such, although the computer 34 and the set top box 32 may use the same physical media for their network connections, these networks are separate and distinct and the system 10 depicted in FIG. 1 links these separate and distinct networks by having the data stream server 24 insert a token into the content generated by the token creation tool 14, wherein the token logically links portions of the television broadcast content to content stored on the network coupled to and accessible by the computer 34.

The depicted set top box 32 can be any suitable set top box device that can receive and process data transmitted over the television broadcast network. Similarly, the depicted computer 34 can be any suitable computer for coupling to a computer data network. Typically, the computer 34 at the consumer station 30 is a conventional home computer with a connection through an interne service provider to the internet data network.

In operation, the content producer using the content production station 16 determines which segments or portions of the television broadcast to link to content stored on or generated by the computer data network that is accessible by computer 34. The content producer can also determine the actual content or site that they want logically linked to the selected segment of the television data. The content producer then may use the token creation tool 14 to register those decisions in the token registry 18. To this end, the token registry 18 receives token instructions as determined by the content producer 16. These token instructions indicate what content the token is to link to on the computer network, what broadcast content the token is associated with, how long the token is to last, what the visual icon will took like that informs the viewer of the linked computer content, where that icon will appear on the screen, and other information relevant to the type of logical link being created between the television content and the associated content on the computer data network.

The content producer also sends the content to the television station 20 in any file format the content producer wishes. The content is loaded into the storage traffic automation system 22 and the playout of that content is eventually scheduled and played by the television station's automation system 22. As depicted in FIG. 1, the token registry 18 couples via path 4 to the data stream server 24. Prior to playout, the data stream server receives over path 4 the token instructions from the token registry. In some embodiments personnel or processes at the television station 20 initiate the transfer of token information from the token registry 18 to the data stream server 24 and may optionally associate the television station's internal identifiers with specific tokens in the registry. In one operation, the automation system 22 provides an instruction to the data stream server 24. That instruction directs that data stream server to insert a specific token or token play list at a specific time into the MPEG-2 transport stream that is being transmitted from multiplexer 28 to the set top box 32 of the consumer 30. Upon receiving the trigger to insert the token data, the data stream server 24 collects the proper token and inserts that token into the meta data section of the MPEG-2 transport stream. To enable this process, the set of tokens to be inserted in the stream includes an identifier carrying data representative of at least one of a network location of the packet generator, a date for inserting the respective token into the stream, a time for inserting the respective token into the stream, and an application or script that the set top box can execute.

FIG. 2 depicts one embodiment of a token suitable for insertion into the meta data stream. In particular, the token of FIG. 2 will create a token MPEG-2 data stream that will include a token that uniquely identifies itself as CVB_100000001021. Further information in the token indicates that the token icon is of type "1" (info) and the icon is to be positioned on the screen at 83% of the screen on vertical and 83% of the screen on horizontal and should remain active for 84 seconds. This icon will display three seconds after the receipt of the token stream by the set top box 32 and be displayed for 76 seconds. Once inserted into the stream, the transport stream is delivered down to the set top box 32 and the set top box 32 may recognize the token data and display the visual cue (icon) that the token data instructs the set top box to present. Typically, the visual cue indicates that there is content that can be requested from the computer data network that is associated with the content being received over the set top box 32. In one operation, the consumer accesses this information by clicking on the remote control that they would like to activate the link to the content on the computer network. As described in U.S. application Ser. No. 12/001,663, the contents of which are incorporated herein in their entirety, the information associated with that token can be delivered to the consumer's computer station 34.

The storage traffic and automation system 22 depicted in FIG. 1 is shown in this embodiment as a television station automation system. Such an automated system manages a playout list that includes that schedule of broadcast content that is being delivered across the television network to the set top box device 32. As such, it maintains the information about which video assets are to be played from moment to moment throughout the day and the automation system 22 calls each video asset from its input or storage source. The automation system 22 may schedule primary events such as a commercial or a show and secondary events such as a graphic overlay or a crawler. Alternatively, the automation system may control highly detailed events within a single television program, such as switching between a studio camera and a live field camera during a news broadcast. The data stream server 24 may be integrated with the automation system 22. In one embodiment, the data stream server 24 is coupled to the automation system 22 as shown in FIG. 1, in this embodiment, the automation system 22 may alert the data stream server 24 when each video asset is about to be played and the data stream server 24 checks its database to see if any tokens are scheduled for that video asset. If there are scheduled tokens, the data stream server 24 synchronizes the playout of the tokens along with the automation system's playout of the video. In an alternative practice, users may enter token insertions as secondary events in the automation system playout list so a playout message for the secondary event will be sent from the automation system 22 to the data stream server 24 to trigger the token insertion.

Optionally, in an alternative embodiment, during the insertion process, the data stream server 24 may insert additional data that is representative of the identification of the data stream server 24, the date and time of the insertion, applications (e.g. EBIF) or scripts, or other data that may be used by downstream components of the system. In this way, the set top box receives token information representative of both the content on the data network associated with the broadcast content and other information such as that representative of the data stream senier that delivered that content and token. In this example, geographic information is provided to the set top box 30 indicating the source of the token associated with the computer content. In a further optional embodiment, the action of the user to activate the link results in a return to the computer network of a request and this request may carry the token identification as well as the data stream server identification. This information may be returned to any suitable location, such as, for example, the token registry 18 depicted in FIG. 1. The token registry 18 receives the token data and the data stream server identification and is able to close a feedback loop that allows the token registry 18 to recognize the data stream servers that have been sourcing the television content which has been linked by the users to associated computer data content. Additionally, the feedback loop can make sure that the content and token were properly synchronized and actually delivered to the consumer station 30. To this end, an optional feedback monitor may be used for reporting back to the content provider the successful insertion of token data and successful delivery of the token. Additionally and optionally, the system may time stamp the data packets carrying token data to the user site for marking portions of the television content with timing information. This allows for a closer review of the synchronized delivery of the token with the television content.

Figure 3:
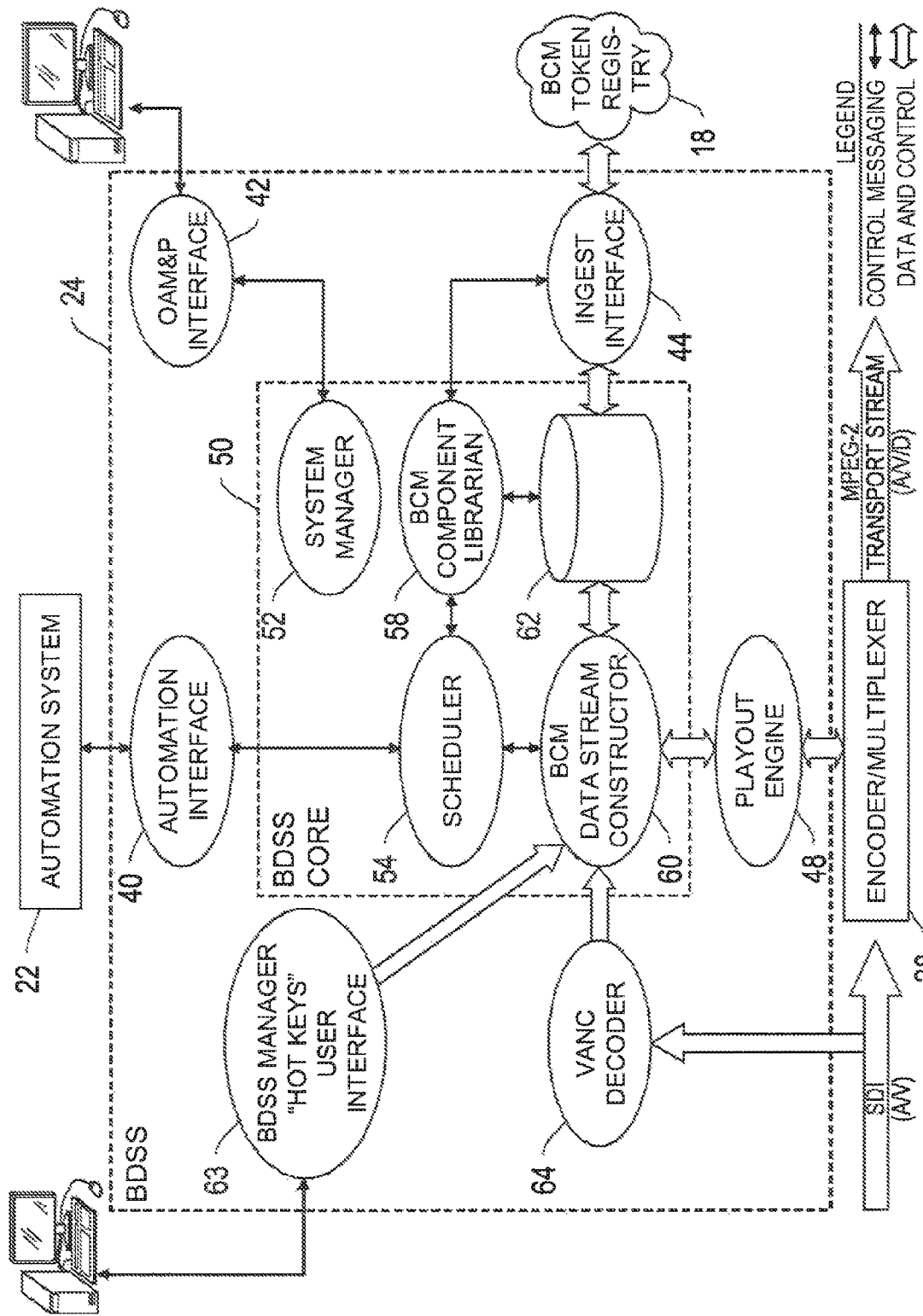
FIG. 3: Depicts one embodiment of a packet generator.

Turning to FIG. 3, there is a depiction of one embodiment of a packet generator. In particular FIG. 3 depicts in more detail the data stream server 24 of FIG. 1 and illustrates the packet generator 50 that is a component of the data stream server 24. The packet generator 50 as shown in FIG. 3 is an element of the data stream server and couples through an automation interface 40 with the automation system 22, and couples through an operation, administration and monitoring and provisioning interface (OAM&P) 42. Additionally, the packet generator communicates data and control messaging with an ingest interface 44 that exchanges data and control signals with the token registry 18.

The packet generator 50 receives triggering controls and scheduling data from the automation system 22 through the automation interface 40. The automation interface 40 is typically a software process that can execute the communication protocol employed by the automation system 22 and can broker data exchanges between the automation system 22 and the packet generator 50. Through this path the triggering and scheduling data passes to the scheduler 54 of the packet generator 50. The scheduler 54 interfaces with the data stream constructor and with the component librarian 58. The scheduler 54 is typically a software process that receives from the automation system 22 a trigger command for triggering the insertion of a specific token into the MPEG-2 transport stream. Additionally, the scheduler 54 may receive the from the automation system 22 data indicating the token to insert into the data stream and commands indicating whether the token is to be inserted periodically or to be inserted as a series of tokens having incrementing values. In either case, the scheduler 54 responds to the information received from the automation system 22 by requesting the component librarian 58 to select from the component library 62 the proper token to insert into the MPEG-2 transport stream. The library 62 may be a database system that stores tokens and may be periodically replenished by the ingest interface 44 that pulls data from the token registry 18, which in turn may be populated by sources such as the token creation tool 14 depicted in FIG. 1, which is external to the system described herein, but that generate tokens for use by this system.

The data stream constructor 60 generates an MPEG-2 transport stream compatible data stream that is delivered to the playout engine 48. The playout engine 48 interfaces with the encoder/multiplexer 28 and delivers the stream thereto for mixing with the television data stream.

Alternative triggering systems are depicted in FIG. 3 including a BDSS Manager user interface 63 to manually trigger tokens to be inserted and a VANC decoder 64 which may detect a pointer representative of a token, in either case, the Backchannel Media (BCM) data stream constructor 60 responds to the information, received from the BDSS Manager (BDSSM) user interface 63 or the VANC decoder 64 by requesting the component librarian 58 to select from the component library 62 the proper token to insert into the MPEG-2 transport stream. Other optional triggering systems may be employed including storing pre-determined dates and times for token insertion in the BCM component librarian 58 and triggering the insertion to commence upon reaching the date and time specified, or from another data stream server located at a different point in the network such as a "hub" control television station, a national broadcast television station or a national content Syndicator, for example.

In some embodiments, the components of the BDSS of FIG. 3 may be located in different parts of either the computer network or the television network. For instance, the encoder-multiplexer 28 may be located at a first television station in either the computer network or the television network, while the automation system 22 may be located at a second television station in either the computer network or the television network. In some embodiments, the automation system 22 may interact with more than one BDSS. Thus, in some embodiments, not every component shown in FIG. 3 will be in the same physical location in either the computer network or the television network.

Figure 4:
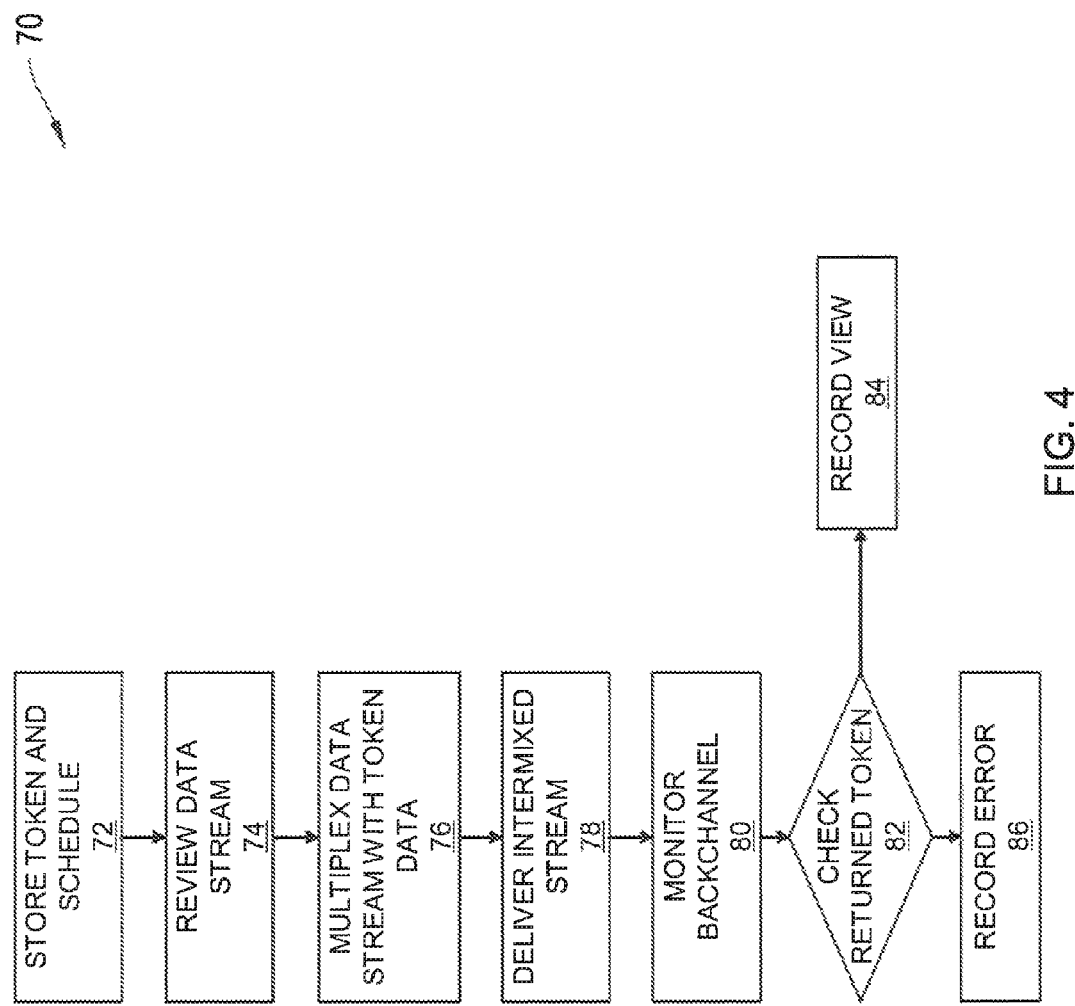
FIG. 4: Presents a flow chart of one process according to the invention.

FIG. 4 presents a flowchart diagram of one process for linking data transmitted over a broadcast media to data on a computer data network. In particular, FIG. 4 presents a process 70 that includes a first step 72 wherein token data is stored in a database and a pointer representative of the token is stored in the program and the play list information is stored in a database as well. Typically the database is part of the storage traffic and automation system 22 depicted in FIG. 1, but it may be a separate system and systems described herein do not rely on any particular process. Further, the database may be any suitable database system, including the commercially available Microsoft Access database, and can be a local or distributed database system. The design and development of suitable database systems are described in McGovern et al., A Guide To Sybase and SQL Server, Addison-Wesley (1993). The database may be supported by any suitable persistent data memory, such as a hard disk drive, RAID system, tape drive system, floppy diskette, or any other suitable system. The database may organize the token data and the play list data into tables that include fields and in any case the database stores the token that is to be inserted into the broadcast content, and information representative of when that broadcast content is expected to be played out and delivered as SDI to the encoder/multiplexer 28, as shown in FIG. 3. To this end, the process 70, in step 74 reviews the raw SDI process stream or streams that are passing into the encoder/multiplexer 28 using a mechanism such as a VANC decoder 63 depicted in FIG. 3.

The encoder/multiplexer 28 processes the SDI stream and packages the SDI stream into and MPEG-2 transport stream protocol. Optionally, a mechanism such as a VANC decoder 64 will monitor the SDI stream to detect pointers representative of tokens within the SDI stream to determine if a token is to be inserted into the MPEG-2 stream being generated. If such a pointer is detected a token is prepared for insertion into the MPEG-stream being generated. The data stream constructor 60 may request from the token registry 46 the token to be inserted to the MPEG-2 transport stream. Alternatively and optionally, the data stream constructor 60 may respond to commands from the scheduler 54 rather than from pointers detected. In the SDI stream by the VANC decoder 64. In this practice the process 70 is driven by the play list stored in the database during step 72. At times noted in the table of the play out list, the scheduler 54 may direct the data stream constructor 60 to collect a specific token from the token registry 46. In either practice, the data stream constructor 60 receives a token and constructs a data stream that is delivered by the play out engine 48 to the data stream constructor 60 and mixed into the SDI data and encoded into the MPEG-2 transport stream in step 76.

In one particular practice, the data stream constructor builds a data stream that the encoder/multiplexer will encode into the program map table of the MPEG-2 transport stream. Once delivered to the MPEG-2 transport stream, the process 70 monitors the back channel of the broadcast data network, as shown by step 80. The process listens for a token that is being returned by a user on the broadcast data network. If a token is detected, the process 70 checks the token against the expected token. In one practice, the process 70 in step 80 checks if the received token matches the content that was being presented to the user at the time the token was detected. If the token check at step 82 indicates that the correct token was returned, then the process 70 proceeds to step 84 and records that the proper token was viewed by the user and returned. If the token is incorrect, the process 70 at step 86 records an error.

Figure 5:
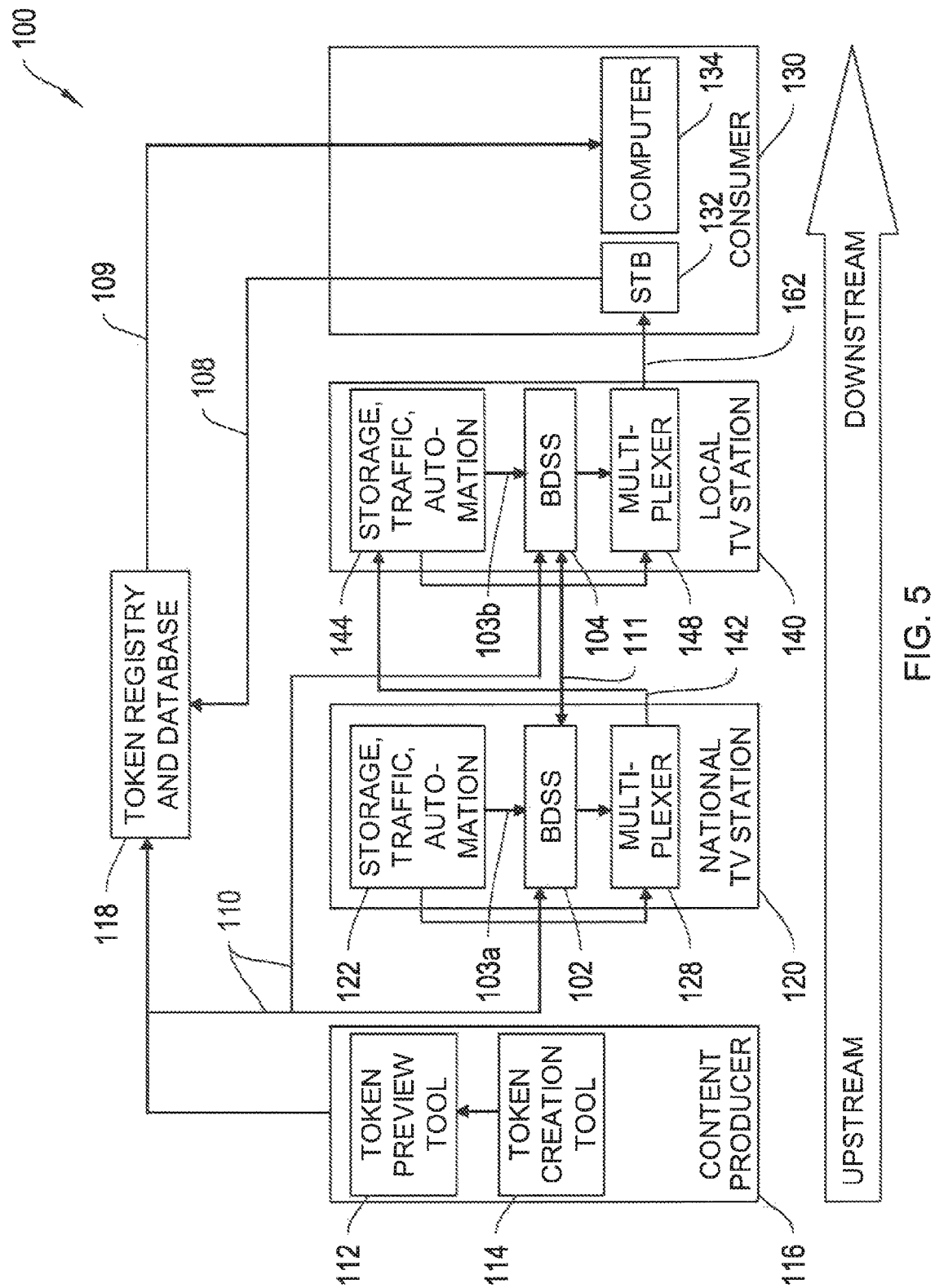
FIG. 5: Depicts a second embodiment of the system according to the invention.

In some embodiments, a plurality of broadcast data stream servers 102, 104 may be employed in different parts of the content distribution network, as shown in FIG. 5. The servers may be located at a broadcast television station, such as national broadcast station 120, or local broadcast station 140. Alternatively, or additionally, the servers 102, 104 may be located at the user site 130, e.g., within set top box 132 or computer 134, at a cable television station (not shown in FIG. 5), a cable system headend (not shown in FIG. 5), a local hub TV station (not shown in FIG. 5), a national content Syndicator (not shown in FIG. 5) or other locations where television content streams are assembled. Each of the data stream servers 102, 104 may be in communication with one another, e.g., via link 111 or via links with the token registry 110, and therefore, may together form a network of data stream servers. In one embodiment, one or more data stream servers, e.g., data stream server 102, may be located at a national broadcast television station 120, while one or more data stream servers, e.g., data stream server 104, may be located at a local broadcast television station 140. The server 104 at the local broadcast television station 140 may be in communication with the server 102 at the national broadcast television station 120. This communication may also take place via a cable communication channel, a network communications interface 109, 110, or 111, or a backchannel communications path 108. Each of the servers 102, 104 may be in communication (via link 110) with the token registry 118 and one or more databases that are associated with it, and carry information relating to the tokens. In addition, each of the servers 102, 104 may interact with automation systems, and multi-plexers (as shown in FIG. 5) that interact with the servers 102, 104 to generate packets to be broadcast via the television network, in addition, the servers 102, 104 may include BCM data stream constructors (not shown in FIG. 5).

As illustrated by the example in FIG. 5 the network of servers 102, 104 could be used by both the national and local broadcasters to insert packets of broadcast data and/or token data into an MPEG-2 transport stream 142, 162. The BDSS server 102 at the national TV station 120 may insert tokens into the national broadcast stream 142 when triggered by a variety of events such as by a live operator, upon detecting triggers in the SDI stream, upon reaching a pre-specified date and time, or in response to commands from the Storage/Traffic/Automation system 122. Once the national broadcast stream 142 has been constructed and encoded into an MPEG-2 transport stream, it may be received by the storage, traffic and automation system 143 within local broadcast station 140. The local broadcast station data stream server 104, in conjunction with encoder/multiplexer 148, may process the incoming broadcast stream to generate an outgoing MPEG-2 transport stream 162 which may be received by the Consumer STB 132.

Alternatively and optionally, the data stream constructor within the data stream server 104 may respond to commands from a scheduler as described in relation to FIGS. 3 and 4, or at least in part on information received from the national broadcast station data stream server 102. The sequence and schedule of a plurality of token insertions performed by the national data stream server 102 in response to a plurality of triggers at the national TV station can be recorded and stored into the database as a new token playlist which can be executed in response to a single trigger. In this manner the national data stream server 102 may respond to a number of triggers available within the national TV station 120, insert the required tokens into the broadcast stream 142, and store the new consolidated token playlist in the database. The local TV station data stream server 104 can retrieve the new consolidated playlist and re-insert the tokens inserted by the data stream server 102 at the national. TV station 120 in response to a single trigger when the plurality of national TV station triggers is not available at the local TV station. This practice may be used in the event that the tokens inserted at a national TV station are removed from the broadcast stream 142 prior to reaching the Consumer SIB 132 within the local broadcast stream 162, such as when a local TV station transforms the national TV broadcast stream 142 from MPEG-2 into a different format before creating the final broadcast stream 162 destined for the Consumer STB 132.

As discussed above, the broadcast data stream server or BDSS may be realized as a hardware component. Additionally, or alternatively, the BDSS may be realized as a software component operating on a conventional data processing system such as a Unix workstation. In that embodiment, the data stream server may be implemented as a C language computer program, or a computer program written in any high level language including C++, Fortran, Java or basic.

Additionally, in an embodiment where microcontrollers or DSPs are employed, the data stream server may be realized as a computer program written in microcode or written in a high level language and compiled down to microcode that can be executed on the platform employed. The development of such systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). Developing code for the DSP and microcontroller systems follows from principles well known in the art.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

The invention claimed is:

1. A system for providing a token for reinsertion within a television distribution network, said system comprising:
   a database in communication with a first data stream server, said database configured to store data confirming that said first data stream server previously caused a token to be inserted into a television data stream within a television distribution network; and
   a second data stream server in communication with said database, said second data stream server configured to:
   receive from said database said data confirming that said first data stream server previously caused said token to be inserted into said television data stream; and
   in response to receipt of said data, cause said token to be reinserted within said television distribution system, said reinsertion comprising insertion of said token into a broadcast television data stream for broadcast to a plurality of set top boxes within said television distribution network, said token for causing said plurality of set top boxes to monitor for and process responses from users of said set top boxes.

2. The system of claim 1, wherein said second data stream server comprises a packet generator for generating packets for broadcast over said television distribution network to said plurality of set top boxes, wherein said packets comprise token data associated with said token.

3. The system of claim 2, wherein the packet generator provides said packets for insertion into a private data section or packetized elementary stream associated with a
   program of a transport stream and being representative of television content broadcast over the television distribution network.

4. The system of claim 2, further comprising a multiplexer coupled to the packet generator for multiplexing said packets comprising said token data with television content for broadcast to said plurality of set top boxes over the television distribution network.

5. The system according to claim 2, wherein the token data comprises data representative of a network location of the packet generator.

6. The system according to claim 2, wherein the token data comprises data representative of an application or script that the set top box can execute.

7. The system according to claim 6, wherein said application or script is an EBIF application or script.

8. The system according to claim 2, further comprising a time stamp for stamping data packets carrying token data to mark portions of television content with timing information.

9. The system according to claim 1, further comprising a monitor in communication with said plurality of set top boxes for receiving data from said plurality of set top boxes regarding said token broadcast to said plurality of set top boxes over said television distribution network.

10. The system according to claim 9, wherein said monitor is in communication with said plurality of set top boxes via a back channel in said television distribution network.

11. The system of claim 1, wherein said token is associated with television content in said broadcast television data stream.

12. The system of claim 1, further comprising said plurality of set top boxes configured to receive said broadcast television data stream and said responses from said users of said set top boxes.

13. The system according to claim 1, further comprising a feedback monitor for monitoring the broadcast television data stream being broadcast to the set-top boxes for verifying that the reinserted token is associated with respective content, and for reporting successful reinsertion of said token to a content provider.

14. The system according to claim 1, wherein said second data stream server is further configured to provide a token for insertion into a broadcast television data stream for broadcast to said plurality of set top boxes over said television network in response to an input from a VANC decoder.

15. The system according to claim 1, wherein said second data stream server is further configured to provide a token for insertion into a broadcast television data stream for broadcast to said plurality of set top boxes over said television network in response to an input from a television station automation system.

16. The system according to claim 1, further comprising:
a trigger mechanism in communication with said second data stream server, said trigger mechanism operative to receive an input from a live operator associated with a television facility;
wherein said second data stream server is further configured to:
receive a signal indicating that said live operator associated with said television facility has provided said input to said trigger mechanism; and
in response to receipt of said signal, provide a token for insertion into said broadcast television data stream for broadcast to said plurality of set top boxes over said television distribution network.

17. The system according to claim 1, wherein:
said database is configured to store data confirming that said first data stream server previously caused a playlist of tokens to be inserted into a television data stream within a television distribution network; and
said second data stream server is configured to cause said playlist of tokens to be reinserted within said television distribution system in response to receipt of said data from said database, said reinsertion comprising insertion of said
tokens into said broadcast television data stream for broadcast to said plurality of set top boxes within said television distribution network.

18. The system of claim 17, wherein:
said first data stream server previously caused said playlist of tokens to be inserted into said television data stream in response to a plurality of triggers;
said data confirming that said first data stream server previously caused said playlist of tokens to be inserted into said television data stream comprises a sequence and schedule for insertion of said playlist of tokens; and
and said second data stream server is configured to cause, based on said data comprising said sequence and schedule, said playlist of tokens to be reinserted within said television distribution system in response to a single trigger.

19. The system of claim 1, further comprising said first data stream server, wherein said first data stream server is located upstream of said second data stream server in said television distribution network.

20. The system of claim 1, wherein:
said first data stream server caused said token to be inserted into said television data stream in association with a television advertisement;
said data confirming that said first data stream server previously caused said token to be inserted into said television data stream comprises a schedule for insertion of said token in association with said television advertisement; and said second data stream server is configured to cause, based on said data comprising said schedule, said token to be inserted into said broadcast television data stream in association with said television advertisement for broadcast over the television distribution network to said plurality of set top boxes.

21. The system of claim 1, wherein:
said first data stream server caused said token to be inserted into said television data stream in association with television content in response to a live operator input;
said data confirming that said first data stream server previously caused said token to be inserted into said television data stream comprises a schedule for insertion of said token in association with said television content; and
said second data stream server is configured to cause, based on said data comprising said schedule, said token to be inserted into said broadcast television data stream in association with said television content for broadcast over the television distribution network to said plurality of set top boxes.

22. A method for providing a token for reinsertion within a television distribution network, said method comprising:
storing, in a database in communication with a first data stream server, data confirming that said first data stream server previously caused a token to be inserted into a television data stream within a television distribution network;
receiving, by a second data stream server in communication with said database, said data confirming that said first data stream server previously caused said token to be inserted into said television data stream; and
in response to receipt of said data, causing by said second data stream server said token to be reinserted within said television distribution system, said reinsertion comprising insertion of said token into a broadcast television data stream for broadcast to a plurality of set top boxes within said television distribution network, said token for causing said plurality of set top boxes to monitor for and process responses from users of said set top boxes.

23. The method according to claim 22, further comprising receiving, with a monitor in communication with said plurality of set top boxes, data from said plurality of set top boxes regarding said token broadcast to said plurality of set top boxes over said television distribution network.

24. The method according to claim 23, wherein said receiving with said monitor comprises receiving said data over a back channel in said television network.

25. The method of claim 22, wherein said token is associated with television content in said broadcast television data stream.

26. The method of claim 22, wherein:
said storing data comprises storing data confirming that said first data stream server previously caused a playlist of tokens to be inserted into a television data stream within a television distribution network; and
said causing said reinsertion comprises causing said playlist of tokens to be reinserted within said television distribution system in response to receipt of said data from said database, said reinsertion comprising insertion of said tokens into said broadcast television data stream for broadcast to said plurality of set top boxes within said television distribution network.

27. The method of claim 26, wherein:
said first data stream server previously caused said playlist of tokens to be inserted into said television data stream in response to a plurality of triggers;

said data confirming that said first data stream server previously caused said playlist of tokens to be inserted into said television data stream comprises a sequence and schedule for insertion of said playlist of tokens; and said causing said reinsertion by said second data stream server comprises causing, based on said data comprising said sequence and schedule, said reinsertion of said playlist of tokens by said second data stream server in response to a single trigger received by said second data stream server.

28. The method of claim 22, further comprising causing by said first data stream server said token to be inserted into said television data stream within said television distribution network, wherein said first data stream server is located upstream of said second data stream server in said television distribution network.

29. The method of claim 22, wherein:

said first data stream server caused said token to be inserted into said television data stream in association with a television advertisement;

said data confirming that said first data stream server previously caused said token to be inserted into said television data stream comprises a schedule for insertion of said token in association with said television advertisement; and said causing said token to be inserted into said broadcast television data stream comprises causing, by said second data stream server based on said data comprising said schedule, said token to be inserted into said broadcast television data stream in association with said television advertisement for broadcast over the television distribution network to said plurality of set top boxes.

30. The method of claim 22, wherein:

said first data stream server caused said token to be inserted into said television data stream in association with television content in response to a live operator input;

said data confirming that said first data stream server previously caused said token to be inserted into said television data stream comprises a schedule for insertion of said token in association with said television content; and said causing said token to be inserted into said broadcast television data stream comprises causing, by said second data stream server based on said data, said token to be inserted into said broadcast television data stream in association with said television content for broadcast over the television distribution network to said plurality of set top boxes.

* * * * *